US012465634B2

(12) United States Patent
Wang et al.

(10) Patent No.: US 12,465,634 B2
(45) Date of Patent: Nov. 11, 2025

(54) USE OF TRIMANGANESE TETRAOXIDE PARTICLES IN PREPARATION OF VACCINE ADJUVANT

(71) Applicant: Guangzhou Realbenefitspot Pharmaceutical Co., Ltd., Guangzhou (CN)

(72) Inventors: Yaling Wang, Guangzhou (CN); Chunying Chen, Guangzhou (CN); Yuliang Zhao, Guangzhou (CN)

(73) Assignee: Guangzhou Realbenefitspot Pharmaceutical Co., Ltd., Guangzhou (CN)

( * ) Notice: Subject to any disclaimer, the term of this patent is extended or adjusted under 35 U.S.C. 154(b) by 0 days.

(21) Appl. No.: 18/763,977

(22) Filed: Jul. 3, 2024

(65) Prior Publication Data
US 2025/0057947 A1  Feb. 20, 2025

Related U.S. Application Data

(63) Continuation of application No. PCT/CN2023/079905, filed on Mar. 6, 2023.

(30) Foreign Application Priority Data

Jan. 7, 2022 (CN) ............................. 202210018495

(51) Int. Cl.
*A61K 39/39* (2006.01)
*A61K 39/00* (2006.01)
(Continued)

(52) U.S. Cl.
CPC .......... *A61K 39/39* (2013.01); *A61K 39/0003* (2013.01); *A61K 39/002* (2013.01);
(Continued)

(58) Field of Classification Search
CPC ....................................................... A61K 39/39
See application file for complete search history.

(56) References Cited

FOREIGN PATENT DOCUMENTS

| AU | 2008200021 A1 | 1/2008 |
|---|---|---|
| CA | 3168783 A1 | 9/2021 |

(Continued)

OTHER PUBLICATIONS

Hao, Y. et al. (2016, e-pub. Apr. 29, 2016). "Manganese Dioxide Nanosheets-Based Redox/Ph-Responsive Drug Delivery System For Cancer Theranostic Application," International Journal Nanomedicine 11:1759-1778.

(Continued)

*Primary Examiner* — Carlos A Azpuru
(74) *Attorney, Agent, or Firm* — MORRISON & FOERSTER LLP

(57) ABSTRACT

Disclosed is a use of trimanganese tetraoxide particles in preparation of a vaccine adjuvant. The adjuvant is a particle adjuvant, the particle adjuvant is trimanganese tetraoxide particles externally wrapped with or without an excipient, and the particle size of the particle adjuvant is 5 nm to 3000 nm. The trimanganese tetraoxide particle adjuvant provided in the present invention can be effectively combined with a single-stranded nucleotide adjuvant and can effectively carry an immune antigen, and a more excellent immunotherapy effects can be achieved when a fewer antigen dose and a relatively low injection amount are used; immune cells are efficiently activated, and body fluid balance and cellular immunity are achieved.

21 Claims, 9 Drawing Sheets
Specification includes a Sequence Listing.

(51) Int. Cl.
*A61K 39/002* (2006.01)
*A61K 39/005* (2006.01)
*A61K 39/008* (2006.01)
*A61K 39/015* (2006.01)
*A61K 39/145* (2006.01)
*A61K 39/215* (2006.01)
*A61P 37/04* (2006.01)

(52) U.S. Cl.
CPC .......... *A61K 39/005* (2013.01); *A61K 39/008* (2013.01); *A61K 39/015* (2013.01); *A61K 39/145* (2013.01); *A61K 39/215* (2013.01); *A61P 37/04* (2018.01); *A61K 2039/55505* (2013.01); *A61K 2039/55561* (2013.01)

(56) References Cited

FOREIGN PATENT DOCUMENTS

| CN | 11279181 | * | 5/2012 |
|---|---|---|---|
| CN | 104456572 | * | 12/2017 |
| CN | 107456575 A | | 12/2017 |
| CN | 109939229 A | | 6/2019 |
| CN | 13274492 | * | 8/2021 |
| CN | 112791181 A | * | 8/2021 |
| CN | 113274492 A | | 8/2021 |
| CN | 13797329 | * | 12/2021 |
| CN | 113797329 A | | 12/2021 |
| CN | 114432437 A | | 5/2022 |
| WO | 2023131356 | * | 7/2023 |
| WO | 2023131356 A2 | | 7/2023 |

OTHER PUBLICATIONS

International Preliminary Report on Patentability issue date of Jun. 20, 2024 for Patent Application No. PCT/CN2023/079905, filed Mar. 6, 2023, 6 pages (English Translation).

International Search Report and Written Opinion of the International Searching Authority mailed on Jul. 5, 2023 for PCT Application No. PCT/CN2023/079905 filed on Mar. 6, 2023, 17 pages (English Translation).

* cited by examiner

Trimanganese tetraoxide nanoparticles

Trimanganese tetraoxide microparticles

SEQUENCE LISTING

```
Sequence total quantity: 2
SEQ ID NO: 1              moltype = DNA  length = 22
FEATURE                   Location/Qualifiers
source                    1..22
                          mol_type = other DNA
                          organism = synthetic construct
misc_feature              22
                          note = 3' SH (thiol) modified
SEQUENCE: 1
tcgtcgtttt cggcgcgcgc cg                                          22

SEQ ID NO: 2              moltype = DNA  length = 22
```

| FEATURE | Location/Qualifiers |
|---|---|
| source | 1..22<br>mol_type = other DNA<br>organism = synthetic construct |

SEQUENCE: 2
tcgtcgtttt cggcgcgcgc cg                                22

USE OF TRIMANGANESE TETRAOXIDE PARTICLES IN PREPARATION OF VACCINE ADJUVANT

CROSS REFERENCE TO RELATED APPLICATION

This application is a Continuation Patent Application of PCT Application No. PCT/CN2023/079905, filed on Mar. 6, 2023, which claims priority to and benefit of Chinese Patent Application No. 202210018495.5, filed on Jan. 7, 2022, the contents of each of which are herein incorporated by reference in their entirety.

STATEMENT REGARDING SEQUENCE LISTING

The content of the electronic sequence listing (792292000201 subseqlist.xml; Size: 3,258 bytes; and Date of Creation: Jul. 24, 2024) is herein incorporated by reference in its entirety.

TECHNICAL FIELD

The present invention relates to the fields of biomedicine technology and vaccine technology, and in particular to the use of trimanganese tetraoxide particles in the preparation of vaccine adjuvants.

BACKGROUND TECHNOLOGY

Vaccines refer to biological products made from various pathogenic microorganisms for use in vaccination. Since the development of vaccines, the elimination of many diseases such as smallpox has been achieved. Various types of vaccines have been developed to combat infectious diseases such as the novel coronavirus, for example, nucleic acid vaccines, inactivated virus vaccines, recombinant protein vaccines, viral vector vaccines, subunit vaccines. Among them, subunit vaccines are the most studied vaccines due to their safety, wide use, and high degree of customizability. However, subunit vaccines have weak immunogenicity and therefore require repeated administration with the aid of adjuvants. Adjuvants, as nonspecific immunoenhancers, play an important role in inducing effective immune responses after vaccination.

Traditional aluminum adjuvants can induce effective humoral immune responses but are difficult to induce cellular immune responses. There is growing evidence that antibody- and T-cell-mediated immunity is required to effectively protect against the novel coronavirus. However, aluminum adjuvants can only activate humoral immunity and lack mucosal immunity's ability.

Manganese is a nutritional inorganic trace element required for a variety of physiological processes, including development, reproduction, and neuronal function. In recent years, the role of manganese as an immunostimulant has gradually been discovered. Manganese adjuvants can induce the production of type I interferon and cytokines in the absence of any infection; in addition, manganese can also activate the cGAS-STING pathway, inducing humoral and cellular immune responses. Currently, there are reports on the application of divalent manganese and tetravalent manganese as vaccine adjuvants. A Chinese patent discloses the use of divalent manganese in the preparation of a drug for improving innate immunity or/and adaptive immunity; a manganese composition comprising divalent manganese for immune enhancement; and a manganese dioxide nanoadjuvant and a preparation method and use thereof. However, the immune-enhancing effect of simple divalent manganese adjuvants or quadrivalent manganese adjuvants needs to be improved.

CPG ODN (CpG oligonucleotide, or CpG oligodeoxynucleotide) is an artificially synthesized oligodeoxynucleotide (ODN) comprising unmethylated cytosine guanine dinucleotide (CpG), which can simulate bacterial DNA to stimulate immune cells of various mammals including humans. It enters through endocytosis, is recognized and bound by TLR9, activates the NF-κB pathway, produces a variety of cytokines, enhances antigen processing and presentation, and induces Th1 immune response. A Chinese patent discloses the immune effect of a divalent manganese adjuvant enhanced by CpG. When this adjuvant is used in a SARS-COV-2 subunit vaccine, the required amount of both Mn and CpG is relatively high (Emerg Microbes Infect 2021, 10 (1), 1555-1573.).

SUMMARY OF THE INVENTION

The present invention aims to overcome the above-mentioned shortcomings of the prior art and provide the use of trimanganese tetraoxide particles in the preparation of vaccine adjuvants. The trimanganese tetraoxide particulate adjuvant provided by the present invention can be effectively combined with single-stranded nucleotide adjuvants and can effectively carry immune antigens to obtain an adjuvant composition vaccine (FIG. 1), which can obtain a more excellent immunotherapeutic effect with a smaller antigen load and a lower injection volume; can effectively deliver immune antigens to lymph node tissue, highly efficiently activate immune cells, and achieve balanced humoral and cellular immunity. Compared with the prior art, the trimanganese tetraoxide particulate adjuvant of the present invention can achieve efficient targeted delivery effect and excellent immune activation effect with one-fifth of the dose in the prior art and one-fourth of concentrations of Mn element and CpG in the prior art.

A first objective of the present invention is to provide use of trimanganese tetraoxide particles in the preparation of a vaccine adjuvant.

A second objective of the present invention is to provide an adjuvant composition.

A third objective of the present invention is to provide a vaccine adjuvant.

A fourth objective of the present invention is to provide a vaccine.

A fifth objective of the present invention is to provide a preparation method of a vaccine.

In order to achieve the above objectives, the present invention is implemented by the following solutions:

Provided is use of trimanganese tetraoxide particles in the preparation of a vaccine adjuvant, wherein the adjuvant is a particulate adjuvant consisting of trimanganese tetraoxide particles externally wrapped with or without an excipient, and the particle size of the particulate adjuvant is 5-3000 nm.

Preferably, the trimanganese tetraoxide particles are externally wrapped with an excipient, and the excipient is one or more of a protein, a polypeptide, a polymer, a nucleic acid, and a polysaccharide. The excipient can react with the single-stranded nucleotide adjuvant through non-covalent adsorption or chemically selective covalent modification, so that the excipient is coupled to the single-stranded nucleotide adjuvant.

More preferably, the single-stranded nucleotide adjuvant is an oligonucleotide comprising CpG ODN.

Further preferably, the oligonucleotide is a DNA fragment, ATP, ADP, or AMP.

Further preferably, the chemically selective covalent modification is based on the chemically selective covalent modification group pairs carried by the excipient and the single-stranded nucleotide adjuvant, and the chemically selective covalent modification groups include: maleimide and 1-(3-dimethylaminopropyl)-3-ethylcarbodiimide, succinimide and 1-(3-dimethylaminopropyl)-3-ethylcarbodiimide.

More preferably, the polypeptide is an extracted polypeptide or chemically synthesized polypeptide consisting of different amino acid sequences.

More preferably, the polymer may be polymers having amino groups or carboxyl groups on the surface including polyethylene glycol, polydopamine, or polyethylene glycol.

More preferably, the polysaccharide includes starch, glycogen, cellulose, chitin, inulin, agar, or hyaluronic acid.

More preferably, the molar ratio of manganese element in the trimanganese tetraoxide particles to the excipient is (20-4000):1.

Further preferably, the molar ratio of manganese element in the trimanganese tetraoxide particles to the excipient is (20-400):1.

Still further preferably, the molar ratio of manganese element in the trimanganese tetraoxide particles to the excipient is (20-300):1.

Preferably, the trimanganese tetraoxide particles are prepared as follows: an aqueous divalent manganese salt solution is sufficiently mixed with an excipient molecular solution to obtain a mixed solution, which is then mixed with an alkaline solution, allowed to sufficiently react, and purified by dialysis to obtain trimanganese tetraoxide particles.

More preferably, after mixing with the alkaline solution, the pH value of the solution is 6-14.

Further preferably, after mixing with the alkaline solution, the pH value of the solution is 6.5-7.4.

The present invention can give particulate adjuvants of different sizes by changing the molar ratio between $Mn^{2+}$, excipient and OH.

More preferably, one or more of sodium hydroxide, potassium hydroxide, calcium hydroxide, aqueous ammonia, triethylamine, pyridine, N-methylmorpholine, and tetramethylethylenediamine are used to adjust the pH of the mixed solution.

More preferably, the concentration of the divalent manganese salt in the mixed solution is 0.01-0.5 mmol/mL, and the concentration of the excipient is 0.005-0.000125 mmol/mL.

More preferably, the conditions for sufficient mixing are as follows: the temperature is 30-37° C., and the system is allowed to react with stirring for 0.2-5 h.

More preferably, the conditions for sufficient reaction are as follows: the system is allowed to react at a temperature of 30-37° C. for 0.2-5 h, then heated to 60-95° C. to react with stirring for 0.2-5 h to promote crystal growth and stability.

Provided is an adjuvant composition, wherein the adjuvant complex contains a particulate adjuvant and a single-stranded nucleotide adjuvant, and the particulate adjuvant consists of the trimanganese tetraoxide particles externally wrapped with or without an excipient.

Preferably, the single-stranded nucleotide adjuvant is an oligonucleotide comprising CpG ODN.

More preferably, the oligonucleotide is a DNA fragment, ATP, ADP, or AMP.

More preferably, the DNA fragment is a modified DNA fragment or an unmodified DNA fragment.

Further preferably, the modified DNA fragment is a DNA fragment subjected to functionalization of amino, carboxyl, or thiol functional groups, or chemically selective covalent modification groups, including maleimidation, succinimidation, and 1-(3-dimethylaminopropyl) 3-ethylcarbodiimide hydrochloride functionalization modification, so as to achieve specific binding of the modified DNA to the surface of the trimanganese tetraoxide particles.

The CpG ODN is divided into type A, type B, and type C according to its immunity-inducing strong Th1-type response and cellular immune stimulating activity: type A CpG ODN induces plasmacytoid dendritic cells (pDCs) to produce a large amount of weak stimulators of IFN-α and NF-κB; type B CpG ODN strongly activates B cells, but weakly stimulates IFN-α secretion; type C CpG ODN combines the characteristics of type A and type B. The C-type CpG ODN induces strong IFN-α production from pDCs and B cell stimulation.

As a specific embodiment, the single-stranded nucleotide is tcgtcgttttcggcgcgcgccg-SH (SEQ ID NO: 1).

Provided is a vaccine adjuvant, prepared by coupling the particulate adjuvant and the single-stranded nucleotide adjuvant in the adjuvant composition in a buffer with a pH of 6 to 9 through chemically selective covalent modification for 0.5-24 h, and then purifying the reaction mixture.

The particulate adjuvant consists of trimanganese tetraoxide particles externally wrapped with an excipient, and the particulate adjuvant is coupled to a single-stranded nucleotide adjuvant through covalent modification; the particulate adjuvant consists of trimanganese tetraoxide particle adjuvant not externally wrapped with an excipient, and the adjuvant is combined with a single-stranded nucleotide adjuvant through adsorption.

Preferably, the coupling by chemically selective covalent modification involves activating the functional groups of the particulate adjuvant and the single-stranded nucleotide adjuvant in the adjuvant composition, and then coupling the particulate adjuvant and the single-stranded nucleotide adjuvant by chemically selective covalent modification using the activated functional groups.

More preferably, the activation of functional groups of the particulate adjuvant comprises activating the amino group or the thiol group with N-hydroxysuccinimide (NHS) or N-hydroxysulfosuccinimide, and adjusting the pH to change the spatial structure of the excipient; the activation of functional groups of the single-stranded nucleotide comprises activating the carboxyl group or the phospholipid group with 1-(3-dimethylaminopropyl)-3-ethylcarbodiimide hydrochloride (EDC).

Preferably, the particulate adjuvant and the single-stranded nucleotide are coupled via EDC/NHS reaction, electrostatic or coordination adsorption.

Preferably, the molar ratio of manganese element to the nucleotide adjuvant in the adjuvant composition is 1:(0.001-1000).

Provided is a vaccine, comprising the adjuvant composition and/or the vaccine adjuvant.

Preferably, the adjuvant composition and/or the vaccine adjuvant carry a vaccine antigen.

More preferably, the vaccine antigens include inactivated pathogens or extracted pathogen subunit antigens, recombinant subunit antigens, antigenic epitope peptides, nucleic acid antigens and combinations thereof.

Further preferably, the pathogens include viruses, bacteria and/or parasites.

Still further preferably, the pathogens include viruses and/or parasites.

Still further preferably, the virus is selected from a DNA virus or an RNA virus; specifically, the virus is selected from the family Coronavirus, the family Herpesviridae, the family Rhabdoviridae, the family Filoviridae, the family Orthomyxoviridae, the family Paramyxoviridae, the family Picornaviridae, the family Hepadnaviridae, the family Flaviviridae, the family Papillomaviridae, the family Poxviridae, and the family Retroviridae, and more preferably, the virus is selected from one or more of the novel coronavirus, influenza virus, herpes simplex virus, vesicular stomatitis virus, vaccinia virus, HIV and HBV.

Still further preferably, the virus is selected from: novel coronavirus and/or influenza virus.

Still further preferably, the bacteria are selected from Gram-positive bacteria and Gram-negative bacteria, specifically, the bacteria are selected from: one or more of *Streptococcus pneumoniae, Haemophilus influenzae, Salmonella, Neisseria meningitidis, Staphylococcus epidermidis, Staphylococcus aureus, Escherichia coli, Klebsiella pneumoniae, Klebsiella oxytoca, Enterobacter cloacae, Citrobacter freundii, Pseudomonas aeruginosa, Acinetobacter baumannii, Mycobacterium tuberculosis*, and *Helicobacter pylori*.

Still further preferably, the parasite is selected from one or more of *Plasmodium, Toxoplasma, Trypanosoma, Schistosoma*, Filaria and *Leishmania*.

Provided is a preparation method of a vaccine, comprising sufficiently mixing the adjuvant composition and/or the vaccine adjuvant with a vaccine antigen to obtain the vaccine.

Preferably, the method of sufficiently mixing comprises repeatedly pumping the system with a syringe 50 to 200 times, and after mixing evenly, placing it on a rotary shaker for mixing for 10-60 min.

Preferably, the vaccine antigens include inactivated pathogens or extracted pathogen subunit antigens, recombinant subunit antigens, antigenic epitope peptides, nucleic acid antigens and combinations thereof.

More preferably, the pathogens include viruses, bacteria and/or parasites.

Further preferably, the pathogens include viruses and/or parasites.

Still further preferably, the virus is selected from a DNA virus or an RNA virus; specifically, the virus is selected from the family Coronavirus, the family Herpesviridae, the family Rhabdoviridae, the family Filoviridae, the family Orthomyxoviridae, the family Paramyxoviridae, the family Picornaviridae, the family Hepadnaviridae, the family Flaviviridae, the family Papillomaviridae, the family Poxviridae, and the family Retroviridae, and more preferably, the virus is selected from one or more of the novel coronavirus, influenza virus, herpes simplex virus, vesicular stomatitis virus, vaccinia virus, HIV and HBV.

Still further preferably, the virus is selected from: novel coronavirus and/or influenza virus.

Still further preferably, the bacteria are selected from Gram-positive bacteria and Gram-negative bacteria, specifically, the bacteria are selected from: one or more of *Streptococcus pneumoniae, Haemophilus influenzae, Salmonella, Neisseria meningitidis, Staphylococcus epidermidis, Staphylococcus aureus, Escherichia coli, Klebsiella pneumoniae, Klebsiella oxytoca, Enterobacter cloacae, Citrobacter freundii, Pseudomonas aeruginosa, Acinetobacter baumannii, Mycobacterium tuberculosis*, and *Helicobacter pylori*.

Preferably, the parasite is selected from one or more of *Plasmodium, Toxoplasma, Trypanosoma, Schistosoma*, Filaria and *Leishmania*.

Preferably, the administration method of the adjuvant vaccine combination reagent includes intramuscular injection, subcutaneous injection, intradermal injection, intravenous injection, mucosal administration and any combination thereof.

Compared with the prior art, the present invention has the following beneficial effects:

The trimanganese tetraoxide particles provided by the present invention can be effectively combined with a single-stranded nucleotide adjuvant and can effectively carry an immune antigen, and can obtain more excellent immunotherapeutic effects at a smaller antigen dose and a lower injection volume; it can efficiently activate immune cells and achieve balanced humoral and cellular immunity.

BRIEF DESCRIPTION OF THE DRAWINGS

FIG. 4 shows the evaluation of BMDCs activation and antigen presentation ability of the adjuvant composition vaccine constructed in Example 4 of the present invention and different experimental groups of vaccines in Example 5, wherein

DETAILED DESCRIPTION

Figure 1:
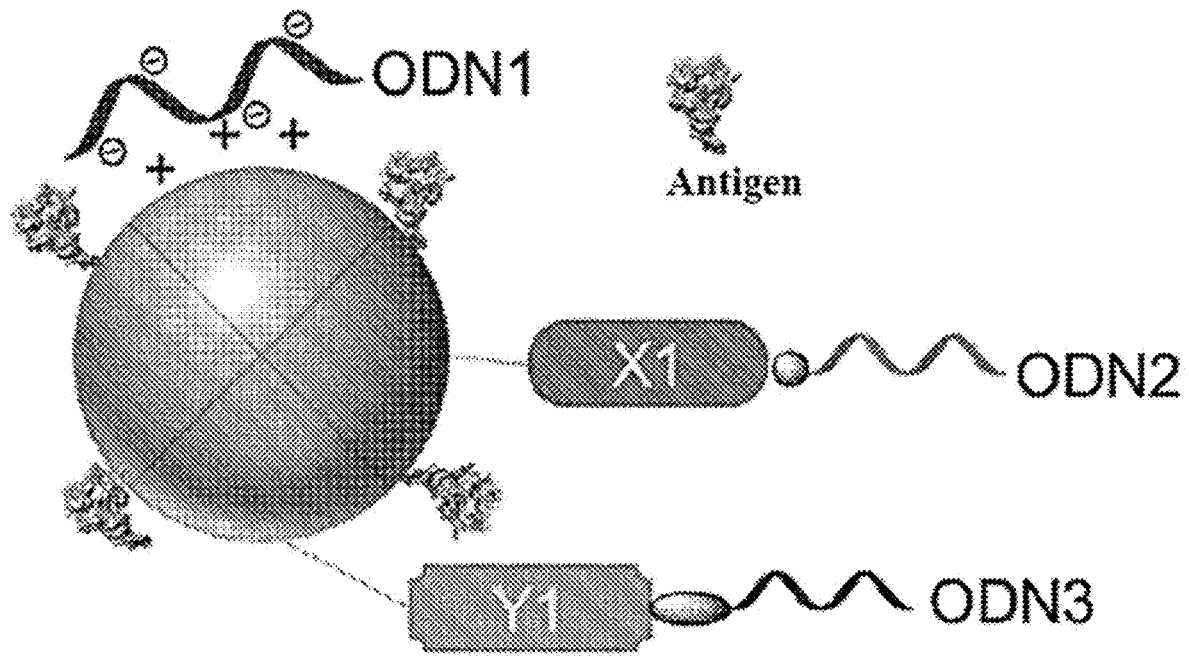
FIG. 1 is a schematic diagram of the structure of the adjuvant composition vaccine; X1 can be a protein, polypeptide, polymer, nucleic acid, polysaccharide, and its surface has a modifiable amino group, carboxyl group or thiol group; it can also be a protein, polypeptide, polymer, nucleic acid, polysaccharide comprising Y1; Y1 is a chemically selective cross-linking group (such as maleimide, succinimide); ODN1 is a negatively charged single-stranded nucleotide (including CpG, CpG derivatives and other single-stranded polynucleotides); ODN2 is a single-stranded nucleotide comprising Y1, which can be combined with a manganese adjuvant comprising X1; ODN3 is a single-stranded nucleotide with functionalized amino, carboxyl or thiol groups, which can be combined with a manganese adjuvant comprising Y1.

The present invention is further described in detail below in conjunction with the drawings and specific examples. The examples are only used to explain the present invention and are not used to limit the scope of the present invention. Unless otherwise specified, the experimental methods used in the following examples are all conventional methods; the materials and reagents used are reagents and materials that can be obtained from commercial channels unless otherwise specified.

Main Reagent Sources:
- SARS-COV-2 RBD antigen was purchased from Sino Biological, catalog number 40592-V08H4;
- The experimental group CpG adjuvant used in the exemplary embodiments of the present invention is: C-type CpG-ODN 2395, [5'-tcgtcgttttcggcgcgcgccg-3'] (SEQ ID NO: 2), InvivoGen, product catalog number: tlrl-2395-1.
- The thiolated CpG ODN (sequence: tcgtcgttttcggcgcgcgccg-SH (SEQ ID NO: 1)) in the examples was custom-synthesized by Sangon Biotech.
- Carboxylic acid polyethylene glycol maleimide, COOH-PEG-MAL (manufacturer's catalog number PEG-MSCM), methoxy polyethylene glycol propionic acid, mPEG-COOH (manufacturer's catalog number mPEG-PA-2K), were purchased from Jinpan Biotech. Commercial aluminum adjuvant Alum (Invivogen, Alhydrogel® adjuvant 2%, CAS: 21645-51-2)

Example 1 Preparation Method of Trimanganese Tetraoxide Nanoparticulate Adjuvant 240 ml of 0.25 mmol/mL aqueous solution of soluble manganese salt $MnCl^2 \cdot 4H_2O$ and 1 ml of 0.02 mmol/ml COOH-PEG-MAL and 0.18 mmol/ml mPEG-COOH excipient mixed solution were sufficiently mixed to obtain a premixed solution in which the molar ratio of $Mn^{2+}$ to the total excipient was 300:1.

Subsequently, the premixed solution was added to a NaOH solution at a rate of 6.9 ml/min by a peristaltic pump with stirring at 700 rpm for mixing, and the Ph value of the solution was adjusted to 6.9.

Finally, the mixture was allowed to react at 34° C. for 30 min, and then heated to 80° C. to react for 3 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 2 Preparation Method of Trimanganese Tetraoxide Microparticulate Adjuvant 0.5 mmol/ml manganese salt $MnCl_2 \cdot 4H_2O$ was dissolved in 250 ml of water, and then added into 3 mmol/ml NaOH at a rate of 3.9 ml/min by a peristaltic pump for mixing and reaction. After the reaction was completed, 0.02M NaOH was further added to adjust the pH value of the solution to 6.9.

The mixture was stirred at 500 rpm to react at 34° C. for 30 min, and finally heated to 60° C. for reaction for 3 h. After the reaction was completed, the mixture was allowed to stand and cool to room temperature, centrifuged and then washed with 0.5% sodium chloride, and finally sterilized by high-pressure steam or by filtration membrane.

Example 3 Preparation Method of Trimanganese Tetraoxide Nanoparticulate Adjuvant 40 ml of 0.1 mmol/mL aqueous manganese sulfate solution and 200 ml of ovalbumin excipient mixed solution were sufficiently mixed to obtain a premixed solution, in which the molar ratio of $Mn^{2+}$ to the total excipient was 200:1.

Subsequently, the premixed solution was added to a KOH solution at a rate of 3.1 ml/min by a peristaltic pump with stirring at 1000 rpm for mixing, and the Ph value of the solution was adjusted to 7.4.

Finally, the mixture was allowed to react at 30° C. for 60 min, and then heated to 90° C. to react for 2 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 4 Preparation Method of Trimanganese Tetraoxide Nanoparticulate Adjuvant 200 ml of 0.2 mmol/mL aqueous manganese nitrate solution and 100 ml of cyclic RGD polypeptide excipient mixed solution were sufficiently mixed to obtain a premixed solution, in which the molar ratio of $Mn^{2+}$ to the total excipient was 2:1.

Subsequently, the premixed solution was added to a Ca(OH)2 solution at a rate of 5.8 ml/min by a peristaltic pump with stirring at 1400 rpm for mixing, and the Ph value of the solution was adjusted to 6.5.

Finally, the mixture was allowed to react at 20° C. for 90 min, and then heated to 70° C. to react for 5 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 5 Preparation Method of Trimanganese Tetraoxide Nanoparticulate Adjuvant 150 ml of 0.6 mmol/mL aqueous manganese acetate solution and 300 ml of starch (5000 Da) excipient mixed solution were sufficiently mixed to obtain a premixed solution, in which the molar ratio of $Mn^{2+}$ to the total excipient was 100:1.

Subsequently, the premixed solution was added to an aqueous ammonia solution at a rate of 7.2 ml/min by a peristaltic pump with stirring at 900 rpm for mixing, and the Ph value of the solution was adjusted to 7.1.

Finally, the mixture was allowed to react at 35° C. for 40 min, and then heated to 80° C. to react for 2 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 6 Preparation Method of Trimanganese Tetraoxide Nanoparticulate Adjuvant 50 ml of 0.1 mmol/mL aqueous manganese chloride solution and 200 ml of aptamer excipient mixed solution were sufficiently mixed to obtain a premixed solution, in which the molar ratio of $Mn^{2+}$ to the total excipient was 5:1.

Subsequently, the premixed solution was added to a triethylamine solution at a rate of 1.8 ml/min by a peristaltic pump with stirring at 1400 rpm for mixing, and the Ph value of the solution was adjusted to 7.0.

Finally, the mixture was allowed to react at 15° C. for 90 min, and then heated to 60° C. to react for 5 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 7 Preparation Method of Trimanganese Tetraoxide Nanoparticulate Adjuvant 350 ml of 0.3 mmol/mL aqueous manganese chloride solution and 200 ml of polyethylenimine excipient mixed solution were sufficiently mixed to obtain a premixed solution, in which the molar ratio of $Mn^{2+}$ to the total excipient was 50:1.

Subsequently, the premixed solution was added to a triethylamine solution at a rate of 4.8 ml/min by a peristaltic pump with stirring at 900 rpm for mixing, and the Ph value of the solution was adjusted to 7.1.

Finally, the mixture was allowed to react at 35° C. for 40 min, and then heated to 90° C. to react for 2 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 8 Preparation Method of Trimanganese Tetraoxide Nanoparticulate Adjuvant 450 ml of 0.2 mmol/mL aqueous manganese chloride solution and 300 ml of chitin excipient mixed solution were sufficiently mixed to obtain a premixed solution, in which the molar ratio of $Mn^{2+}$ to the total excipient was 250:1.

Subsequently, the premixed solution was added to a triethylamine solution at a rate of 6.9 ml/min by a peristaltic pump with stirring at 1100 rpm for mixing, and the Ph value of the solution was adjusted to 6.7.

Finally, the mixture was allowed to react at 25° C. for 80 min, and then heated to 80° C. to react for 2 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 9 Preparation Method of Trimanganese Tetraoxide Nanoparticulate Adjuvant 250 ml of 0.5 mmol/mL aqueous manganese chloride solution and 200 ml of glycogen excipient mixed solution were sufficiently mixed to obtain a premixed solution, in which the molar ratio of $Mn^{2+}$ to the total excipient was 50:1.

Subsequently, the premixed solution was added to a triethylamine solution at a rate of 3.8 ml/min by a peristaltic pump with stirring at 1300 rpm for mixing, and the Ph value of the solution was adjusted to 7.2.

Finally, the mixture was allowed to react at 35° C. for 40 min, and then heated to 90° C. to react for 1 h to promote the growth and stability of the particle crystal form. After the reaction was completed, the mixture was allowed to stand and cool to room temperature, then centrifuged and washed, and finally sterilized by high-pressure steam or by filtration membrane for later use.

Example 10 Characterization of the Physicochemical Properties of Trimanganese Tetraoxide Particulate Adjuvant I. Observation Under Electron Microscope 1. Experimental Method (1) At 25° C., the trimanganese tetraoxide particulate adjuvant prepared in each of Example 1 and Example 2 was diluted to a concentration of 10 μg/ml and dropped onto a common carbon support film. The structure of the trimanganese tetraoxide particulate adjuvant was observed under an electron microscope (FEI Company, model Tecnai G2 20S-TWIN).

2. Experimental Results

Figure 2:
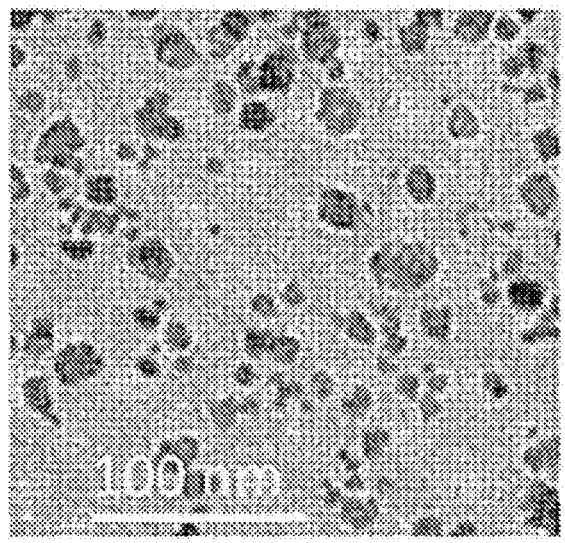
FIG. 2 shows TEM images of the trimanganese tetraoxide particulate adjuvants obtained in Examples 1 and 2 of the present invention.
Figure 2:
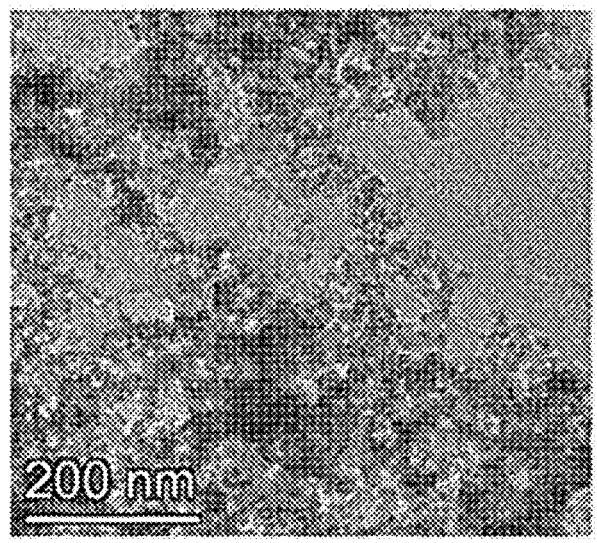

The results are shown in FIG. 2, and FIG. 2 shows TEM images of the trimanganese tetraoxide particles prepared in Example 1 (left) and Example 2 (right).

As shown in FIG. 2, the trimanganese tetraoxide particulate adjuvants prepared in Example 1 and Example 2 are both particulate. When the excipient was present, the average size of the obtained manganese particulate adjuvant was 13.1 nanometers, while when the excipient was absent, the product obtained comprised micron-sized particles formed by aggregation of small particles, with an average particle size of 1582.1 nm, distributed in the range of 350-3000 nm.

II. XRD Characterization of the Trimanganese Tetraoxide Particulate Adjuvant

1. Experimental Method 10 ml of the trimanganese tetraoxide particulate adjuvant prepared in Example 1 with the presence of the excipient was freeze-dried to obtain a powder sample, which was characterized by XRD and then analyzed by Jade.

2. Experimental Results

Figure 3:
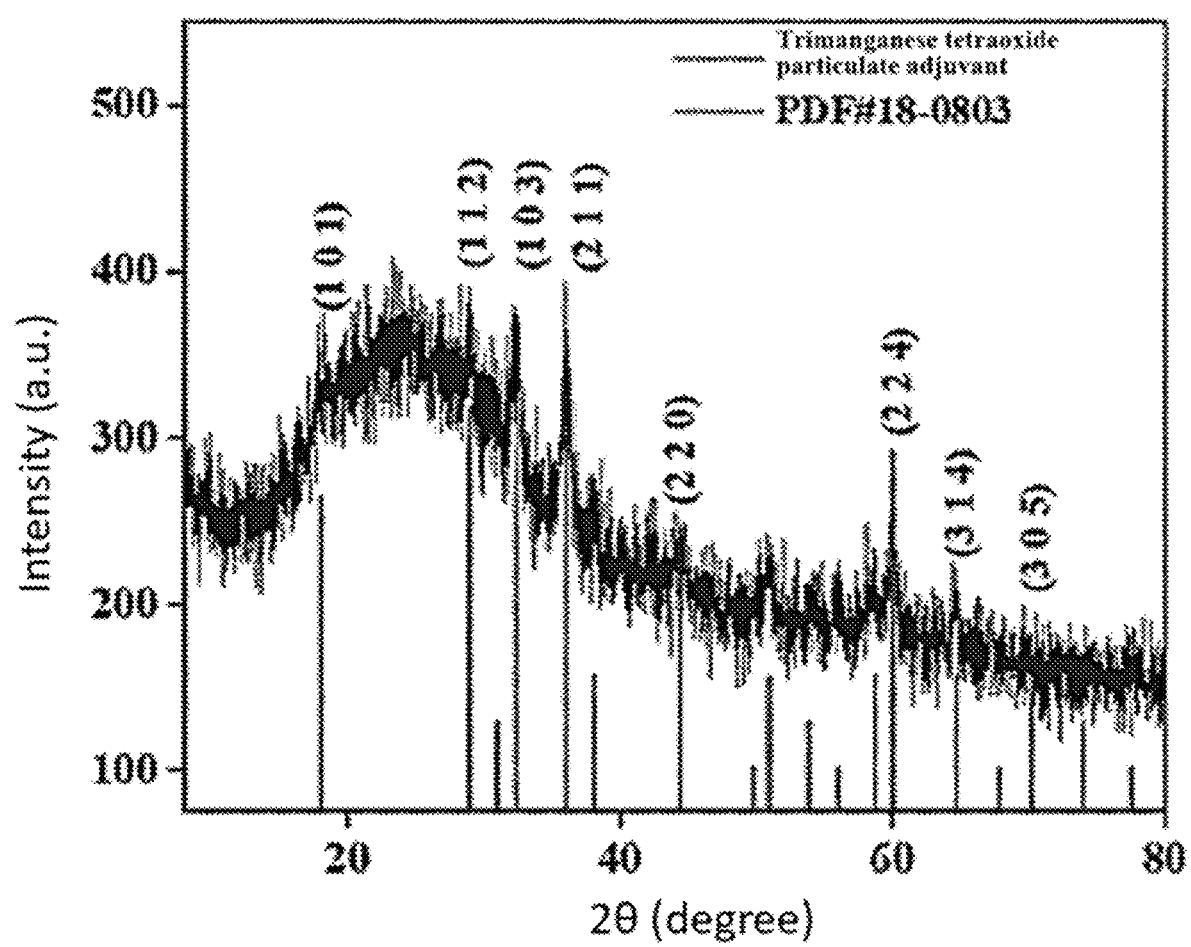
FIG. 3 is an XRD image of the trimanganese tetraoxide particulate adjuvant obtained in Example 1 of the present invention.
Figure 4A:
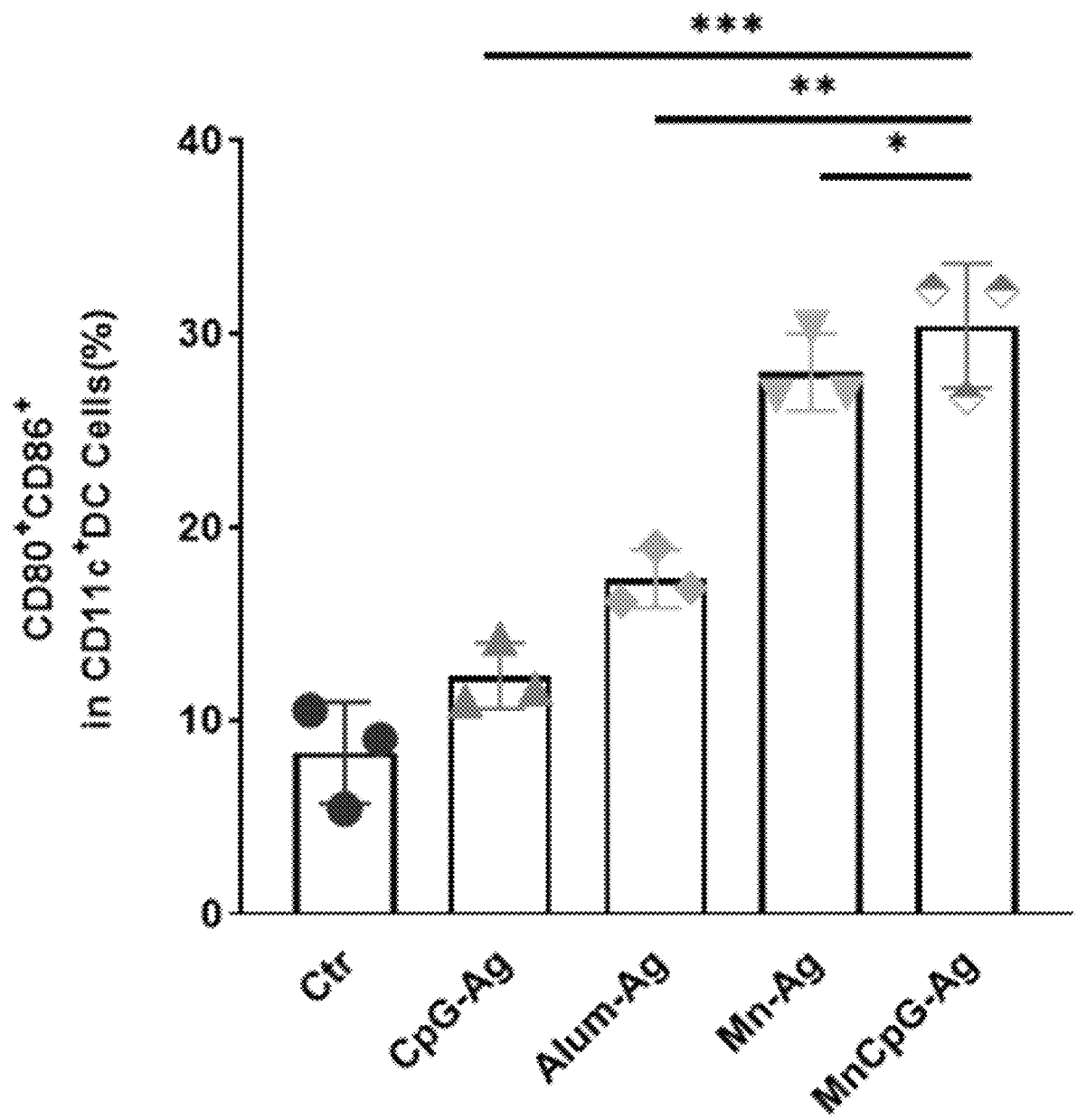
FIG. 4A is the result of BMDC activation experiment, B is the result of MHC-I expression, and C is the result of MHC-II expression.
Figure 4B:
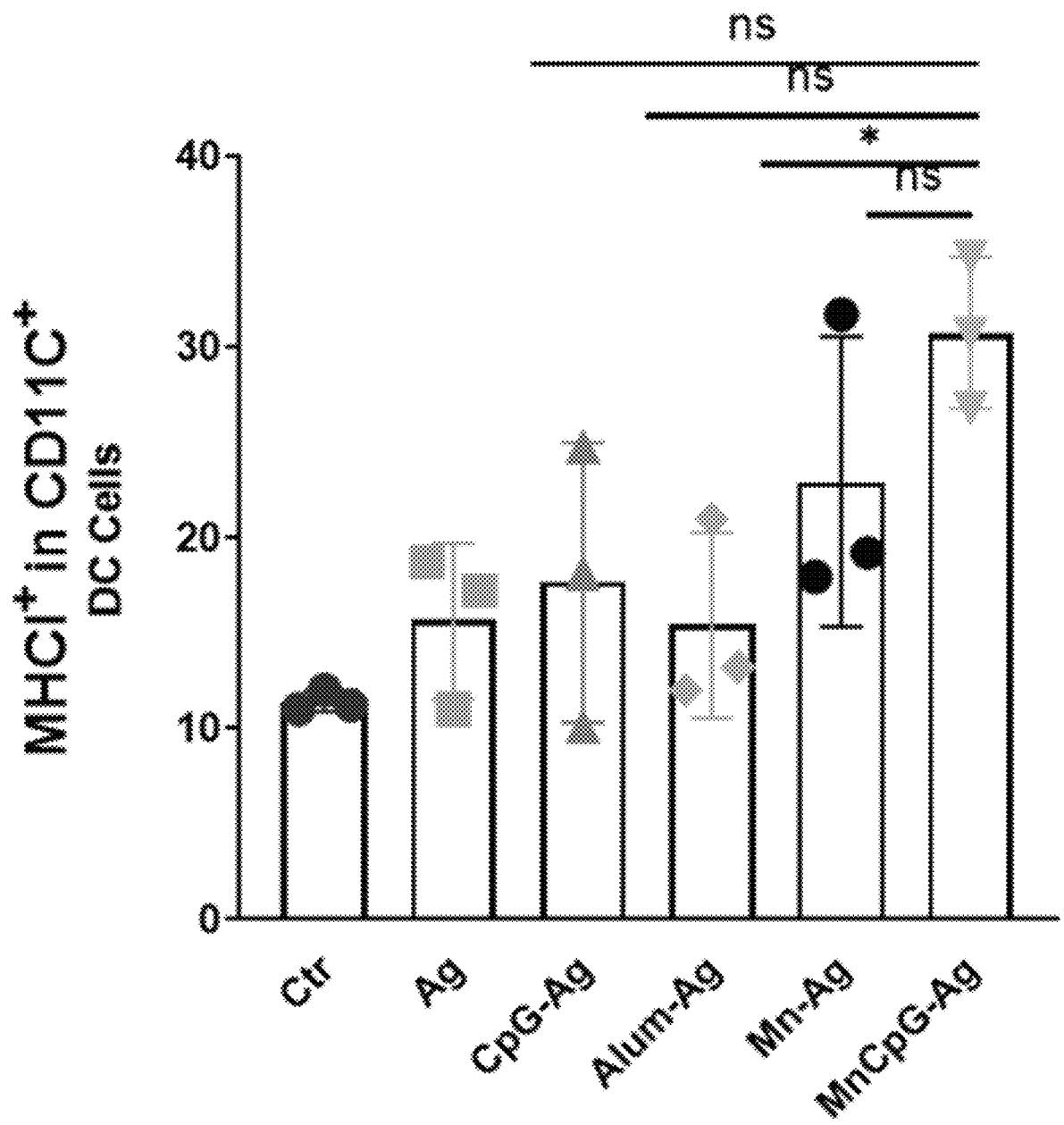
Figure 4C:
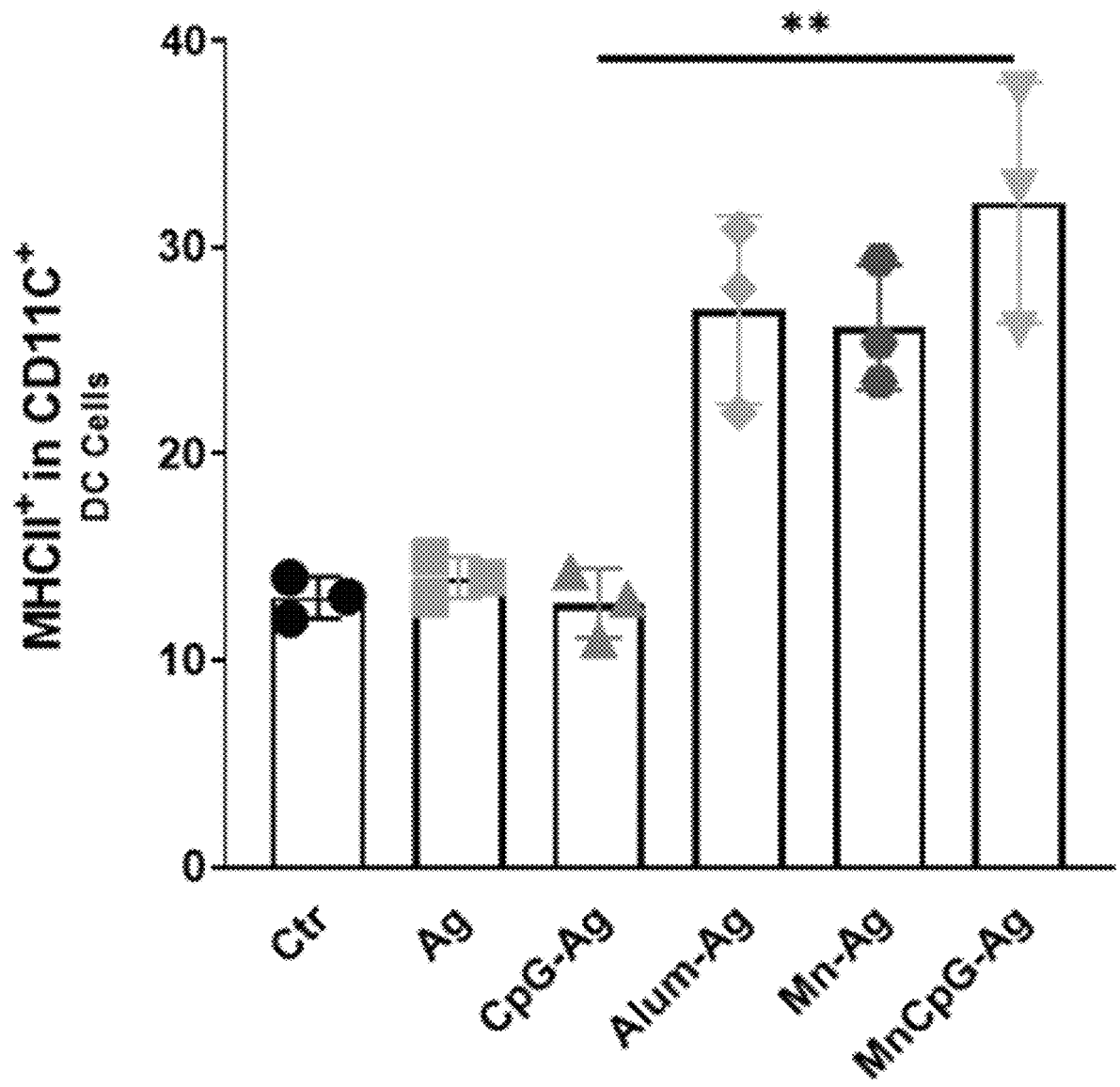

The results are shown in FIG. 3, showing that the manganese particulate adjuvant crystal form obtained in Example 1 corresponds to $Mn_3O_4$.

III. Characterization of the Particle Size and Surface Charge of the Trimanganese Tetraoxide Particulate Adjuvant 1. Experimental Method At 25° C., the concentration of the trimanganese tetraoxide particulate adjuvants prepared in Examples 1-9 of the present invention was diluted to 10 μg/ml, and the hydrated particle size of the trimanganese tetraoxide particulate adjuvant was tested using a nanoparticle size analyzer (purchased from Malvern, Zetasize analyzer Nano ZS model). The results are shown in Table 1.

Similar to what is shown in the TEM results, the particles prepared in Example 2 without the presence of excipients are compared with the trimanganese tetraoxide particles prepared in Example 1 and Examples 3-9 with the presence of excipients, and due to the presence of excipients, the obtained particles have smaller size, more uniform distribution, better dispersibility, and are more stable in an aqueous solution.

| Test items | Example 1 | Example 2 | Example 3 | Example 4 | Example 5 | Example 6 | Example 7 | Example 8 | Example 9 |
|---|---|---|---|---|---|---|---|---|---|
| Average hydrated particle size | 25 nm | 1730 nm | 13 nm | 37 nm | 29 nm | 18 nm | 46 nm | 37 nm | 52 nm |

Example 11 Preparation of a SARS-COV-2 RBD Recombinant Protein Adjuvant Composition Vaccine Combining Trimanganese Tetraoxide Nanoparticulate Adjuvant and CpG A) 5 ml of 0.125 mmol/ml aqueous solution of the trimanganese tetraoxide particles prepared in Example 1 was mixed with an equal volume of 0.0004 mmol/ml thiol-modified CpG (purchased from Sangon Biotech, tcgtcgttttcggcgcgcgccg-SH (SEQ ID NO: 1)). With the pH being maintained at 8.5, the mixture was allowed to react with stirring at room temperature and 300 rpm for 2 h, and purified by ultrafiltration to complete the preparation of the adjuvant composition of trimanganese tetraoxide nanoparticulate adjuvant and CpG to obtain an adjuvant composition of trimanganese tetraoxide nanoparticulate adjuvant and CpG (adjuvant composition MnCpG).

B) 5 ml of 0.125 mmol/ml aqueous solution of the trimanganese tetraoxide particles prepared in Example 2 was mixed with an equal volume of 0.0004 mmol/ml C-type CpGODN2395 (5'-tcgtcgttttcggcgcgcgccg-3' (SEQ ID NO: 2)). With the pH being maintained at 8.5, the mixture was allowed to react with stirring at room temperature and 300 rpm for 2 h, and purified by ultrafiltration to complete the preparation of the adjuvant composition of trimanganese tetraoxide nanoparticulate adjuvant and CpG-ODN2395 to obtain an adjuvant composition of trimanganese tetraoxide nanoparticulate adjuvant and CpG (adjuvant composition Mn2CpG).

C) The adjuvant compositions prepared in steps A and B of this example were dispersed into normal saline respectively, and 10 μg of SARS-COV-2 recombinant RBD antigen (purchased from Sino Biological, catalog number 40592-V08H4) was added to each of them. The system was repeatedly pumped by a syringe 100 times. After mixed evenly, the mixture was placed on a rotary shaker for mixing for 10-60 min to obtain an adjuvant composition vaccine based on a combination of trimanganese tetraoxide nanoparticulate adjuvant and CpG adjuvant and carrying an antigen (SARS-COV-2 RBD recombinant subunit).

Example 12 Evaluation of BMDCs Activation and Antigen Presentation Ability of Adjuvant Composition Vaccine I. Experimental Method 1. Experimental Grouping ① Ctr (control group): The injection volume was 100 μL, and the injection solution was normal saline;

② Ag group: The injection volume was 100 μL, and 10 μg of RBD antigen was injected;

③ CpG-Ag group: The injection volume was 100 μL, and an adjuvant combination of 10 μg of RBD antigen and CpG-ODN2395 (purchased from InvivoGen, product catalog number: tlrl-2395-1) was injected;

④ Mn—Ag group: The injection volume was 100 μL, and 25 μg of manganese-comprising nanoparticulate adjuvant prepared in Example 1 of the present invention carrying 10 μg of RBD antigen (Ag) was injected;

⑤ Alum-Ag group: The injection volume was 100 μL, and 50 μg of commercial aluminum adjuvant Alum (Invivogen, Alhydrogel® adjuvant 2%, CAS: 21645-51-2) carrying 10 μg of RBD antigen was injected;

⑥ MnCpG-Ag group: The injection volume was 100 μl, and the adjuvant composition vaccine constructed in step A of Example 4 was injected, i.e., the adjuvant composition of trimanganese tetraoxide nanoparticulate adjuvant and CpG (adjuvant composition MnCpG) carrying 10 μg of RBD antigen (Ag).

2. Experimental Method

BMDC cells were seeded at $3\times10^5$ cells per well in 6-well plates and allowed to grow overnight. Then, the materials of the above-mentioned 6 different experimental group were added respectively, and after further incubation for 24 h, the cells were collected and stained with anti-CD11c, anti-CD80 and anti-CD86, anti-MHC-1, and anti-MHC-II flow staining solutions. The expression levels of co-stimulatory factors CD80, CD86 and antigen recognition signals MHC-1 and MHC-II on the surface of BMDCs were measured by a flow cytometer.

II. Experimental Results

The results are as shown in FIG. 4. FIG. 4 shows the evaluation of BMDCs activation and antigen presentation ability of the vaccine prepared with the adjuvant composition MnCpG constructed in Example 11 of the present invention and other vaccines with different formulas in Example 6. FIG. 4A shows the results of BMDC activation experiment, FIG. 4B shows the results of MHC-I expression, and FIG. 4C shows the results of MHC-II expression.

As shown in FIG. 4, the adjuvant composition vaccine constructed in Example 11 has a better BMDCs activation effect and a higher antigen presentation ability compared with the single adjuvant vaccine. The adjuvant composition prepared in Example 1 of the present invention (the MnCpG group) can stimulate the activation of BMDCs of about 30.4, which is 2.28 times that of the simple CpG group; and in terms of antigen presentation ability, the MnCpG-Ag group also shows a better antigen presentation effect than the simple CpG.

Example 13 Evaluation of the Efficacy of Adjuvant Composition Vaccine in Immunizing Mice I. Experimental Method 1. Experimental Grouping ① Ctr group (control group): The injection volume was 100 μL, and the injection solution was normal saline;

② Ag group: The injection volume was 100 μL, and 10 μg of RBD antigen was injected;

③ CpG-Ag group: The injection volume was 100 μL, and an adjuvant complex of 10 μg of RBD antigen and CpG-ODN2395 (purchased from InvivoGen, product catalog number: tlrl-2395-1) was injected;

④ Mn—Ag group: The injection volume was 100 μL, and a nano-vaccine constructed by 25 μg of manganese-comprising particulate adjuvant prepared in Example 1 of the present invention carrying 10 μg of RBD antigen (Ag) was injected;

⑤ Alum-Ag group: The injection volume was 100 μL, and 50 μg of commercial aluminum adjuvant Alum (Invivogen, Alhydrogel® adjuvant 2%, CAS: 21645-51-2) carrying 10 μg of RBD antigen was injected;

⑥ MnCpG-Ag group: The injection volume was 100 μl, and the adjuvant composition vaccine constructed in step A of Example 11 was injected, i.e., the adjuvant composition of trimanganese tetraoxide nanoparticles and CpG (adjuvant composition MnCpG) carrying 10 μg of RBD antigen (Ag).

⑦ Mn2CpG-Ag group: The injection volume was 100 μl, and the vaccine constructed in step B of Example 11 was injected, i.e., the adjuvant composition of trimanganese tetraoxide microparticles and CpG (adjuvant composition Mn2CpG) carrying 10 μg of RBD antigen (Ag).

2. Immunization of Mice

Under the premise of complying with the national animal health protocol, BALB/c mice aged 6 to 8 weeks were selected for vaccination twice. The six vaccines in the above groupings were injected intramuscularly for mouse immunization, 100 μl/mouse, with 5 mice in each group, for a total of seven groups. The day for the first vaccination was set as day 0, that for the second vaccination was set as day 21, and serum samples were collected on days 19, 35, and 56.

B) Detection of IgG Titer in Mouse Serum

The IgG titer levels in the serum of mice induced by the vaccines in different experimental groups in step A were evaluated by traditional enzyme-linked immunosorbent assay (ELISA).

The mouse serum was serially and proportionally diluted; the diluted serum was added to a 96-well ELISA plate pre-coated with RBD antigen (2 ug/ml) and incubated at 37° C. for 2 h; the system was washed, and then diluted HRP-conjugated goat anti-mouse IgG antibody (dilution 1:2000) was added, 100 μl per well. The system was incubated at 37° C. for 1.5 h; washed and then incubated together with TMB colorimetric solution. A stop buffer was added to stop the reaction; and the absorbance at OD450 was read using a microplate reader.

C) Detection of Cellular Immunity and Humoral Immunity Biased Antibody Levels

Referring to the above method for testing IgG titer, serum from mice 56 days after immunization in step A of Example 6 of the present invention was collected to evaluate the levels of vaccine-induced cellular immunity and humoral immunity-biased antibodies.

II. Experimental Results

Figure 5:
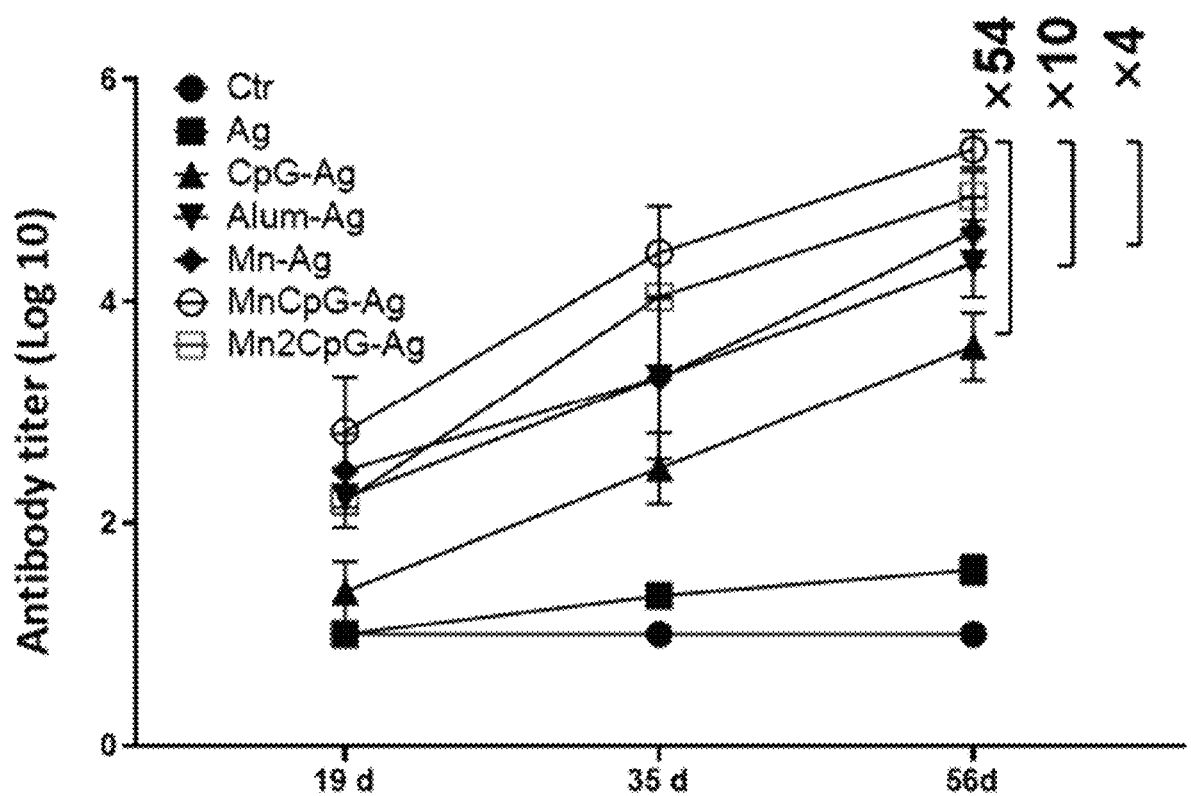
FIG. 5 shows the results of antibody levels in the serum of mice 19d, 35d and 56d after immunization with the adjuvant composition vaccine constructed in Example 4 of the present invention and the vaccines with different formulas in Example 5.

The specific IgG antibody titers of the groups are shown in FIG. 5. FIG. 5 shows the RBD-specific IgG antibody titers in the serum of mice 19, 35 and 56 days after immunization with the adjuvant composition vaccines (MnCpG-Ag group and Mn2CpG-Ag group) constructed in Example 4 and other groups in this example.

As can be seen from FIG. 5, the adjuvant composition vaccine (MnCpG-Ag group and Mn2CpG-Ag group) constructed in Example 11 can effectively enhance the antibody response caused by the SARS-COV-2 vaccine in mice. Through the detection of serum antibodies of several dilutions, it can be seen that the adjuvant composition vaccine (MnCpG-Ag group and Mn2CpG-Ag group) constructed in Example 11 can effectively enhance the IgG immune response level. In the case of carrying the same antigen dose (all 10 micrograms), the antibody titer level of the adjuvant composition vaccine groups (MnCpG-Ag group and Mn2CpG-Ag group) constructed in Example 8 was 4 times that of the Mn—Ag group vaccine with simple trimanganese tetraoxide particulate adjuvant, 10 times that of antibody of the simple Alum adjuvant vaccine, and 50 times that of antibody of the vaccine of the simple CpG adjuvant group, indicating that the adjuvant combination with CpG can enhance the immune enhancement ability of the trimanganese tetraoxide particulate adjuvant.

From the antibody results at 56 days, it can be seen that the antibodies produced by the MnCpG-Ag group in Example 12 are 2.2 times that of the Mn2CpG group, indicating that the nanoparticulate adjuvant bound to CpG by covalent modification can produce higher antibody levels than the micro-particulate vaccine bound to CpG by adsorption. In addition, the antibody level of the Mn2CpG-Ag group was twice that of the Mn—Ag group, indicating that even if the adjuvant composition was prepared by adsorption, the antibodies produced were higher than those of the group with a simple trimanganese tetraoxide adjuvant; it can be seen that the combination of CpG and trimanganese tetraoxide particulate adjuvants, whether through adsorption (Example 2) or covalent modification (Example 1), can significantly enhance the synergistic ability of their respective vaccines, and promote higher antibody production levels compared to the simple antigen Ag group and the CpG-Ag group.

Figure 6:
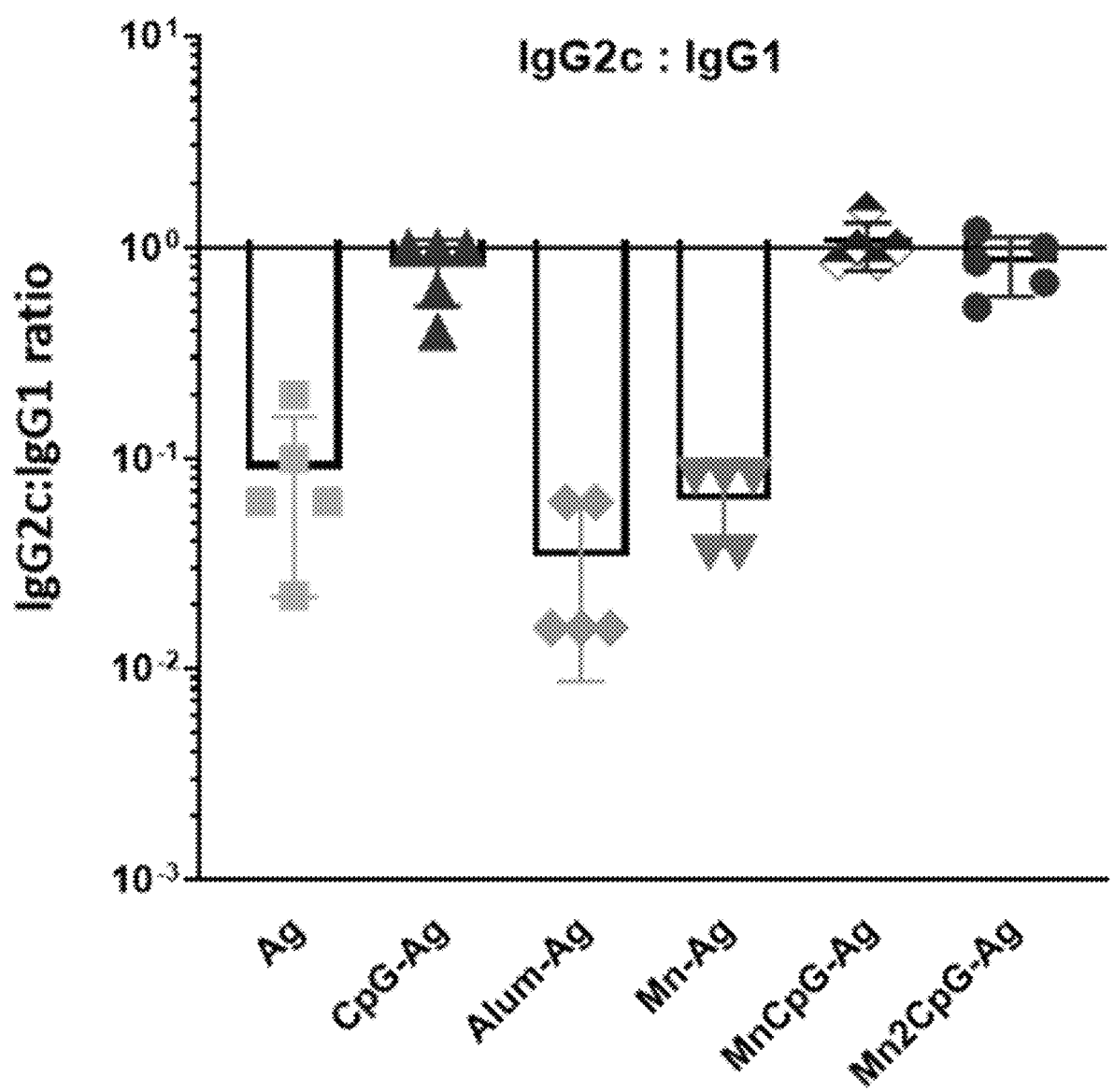
FIG. 6 shows the results of the levels of cellular immunity and humoral immunity-related antibodies in the serum of mice 56d after immunization with the adjuvant composition vaccine constructed in Example 4 of the present invention and the vaccines with different formulas in Example 5.

The comparison of the balance of cellular and humoral immunity induced by the adjuvant composition vaccine constructed in Example 11 is shown in FIG. 6. FIG. 6 shows the evaluation of the balance of cellular and humoral immunity induced by the adjuvant composition vaccine constructed in Example 11 of the present invention and the vaccines with different formulas in Example 12. As shown in FIG. 6, the IgG2C/IgG1 ratio induced by the vaccine prepared with the adjuvant compositions MnCpG and Mn2CpG obtained in Example 11 was close to 1, inducing a balanced T cell response; while the IgG2C/IgG1 ratio of the Mn—Ag group was less than 1, indicating that the simple manganese adjuvant Mn—Ag group induced a Th2-biased immune response, and the CpG adjuvant vaccine induced a Th1-biased immune response.

Example 14 Neutralizing Antibody Response Induced by Adjuvant Composition Vaccine I. Experimental Method The serum samples of mice in the groups 56 days after immunization with the vaccine obtained in step A of Example 12 were subjected to a pseudovirus infection neutralization test. The specific process was as follows: the supernatant comprising the pseudovirus (50 μl; purchased from Sino Biological, catalog number: PSV001) was pre-incubated with serially diluted mouse serum at 37° C. for 1 h, and then added to 293T cells ($5 \times 10^4$ cells) expressing ACE2. Fresh medium was added after 24 h, and the cells were lysed using a commercially available cell lysis buffer. After addition of luciferase substrate, relative luciferase activity was measured in a luminometer (Bio-Tech). The pseudovirus neutralization efficiency was calculated and expressed as the 50% neutralizing antibody titer.

II. Experimental Results

Figure 7:
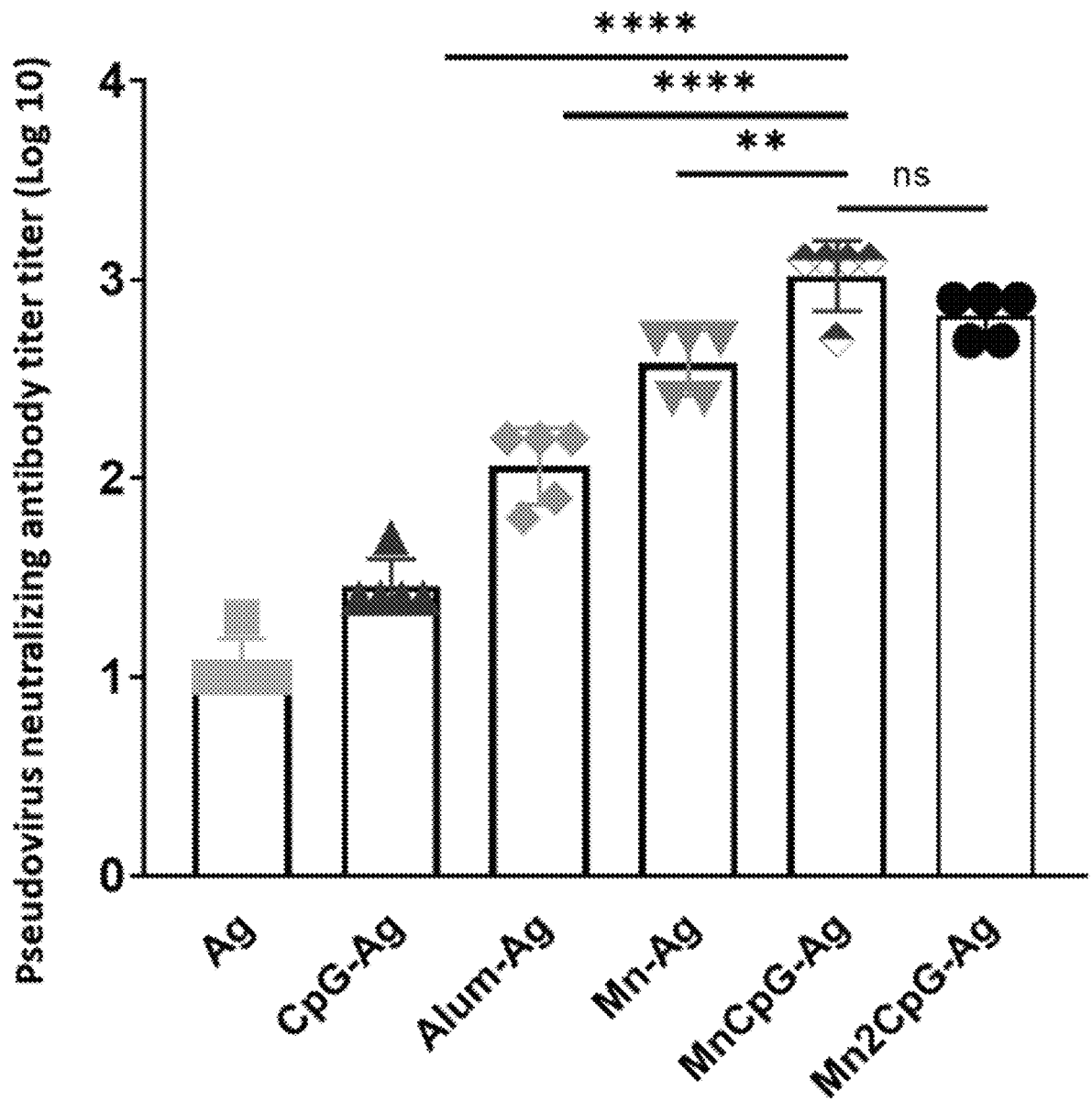
FIG. 7 shows the results of pseudovirus neutralizing antibodies in the serum of mice 56 days after immunization with the adjuvant composition vaccine constructed in Example 4 of the present invention and the vaccines with different formulas in Example 5.

The results are shown in FIG. 7. FIG. 7 shows the comparison of the in vitro immune effects of the adjuvant composition vaccine constructed in Example 11 and other formula vaccines constructed in Example 12 against pseudoviruses. As shown in FIG. 7, the vaccine prepared with the adjuvant compositions MnCpG and Mn2CpG obtained in Example 11 can induce a significantly enhanced neutralizing antibody response against the novel coronavirus. However, the sera of the MnCpG-Ag and Mn2CpG-Ag groups against the novel coronavirus pseudovirus have comparable neutralizing ability.

Example 15 Evaluation of Adjuvant Compositions in Enhancing the Protection Effect of Influenza Subunit Vaccines I. Preparation of Influenza Subunit Vaccine with Adjuvant Composition The adjuvant composition MnCpG and the adjuvant composition Mn2CpG prepared in step A or B of the Example 11 were respectively dispersed in physiological saline to prepare a 1 mg/ml solution, 100 microliters of the solution were pipetted, and 5 µg of influenza subunit antigen (referred to as HINI HA, purchased from Sino Biological, catalog number 40731-V07H) was added. The system was well mixed by shaking or stirring, placed on a rotary shaker for mixing for 10-60 min to obtain influenza subunit vaccines based on the adjuvant composition of trimanganese tetraoxide particulate adjuvant and CpG adjuvant carrying influenza subunit antigens, MnCpG-HA and Mn2CpG-HA.

II. Evaluation of Antibody Levels in Mice Immunized with Influenza Subunit Vaccines The prepared adjuvant composition influenza subunit vaccines MnCpG-HA and Mn2CpG-HA were intramuscularly injected for immunization, and the antigen-specific IgG and IgM antibody titers produced were measured.

The specific procedure is as follows:

Experimental animals: Balb/C mice, 6-8 weeks old, 5 mice/group, female.

Dosage: HINI HA antigen 5 ug/mouse; commercial aluminum adjuvant Alum (purchased from Invivogen, CAS: 21645-51-2):100 µg/100 µl/mouse; MnCpG-HA and Mn2CpG-HA: 100 µg/100 µl/mouse;

Experimental groups and dosages: (1) HA group: HINI HA antigen 5 ug/mouse; (2) Alum-HA group: commercial aluminum adjuvant Alum 100 µg/100 µl+H1N1 HA 5 ug/mouse; (3) MnCpG-HA group: 100 µl of injection solution, comprising MnCpG 100 µg and H1N1 HA antigen 5 µg/mouse; (4) Mn2CpG-HA group: 100 µl of injection solution, comprising Mn2CpG 100 µg and HINI HA antigen 5 µg/mouse.

Immunization regimen: After the mice were immunized with the vaccines, they were boosted with immunization at week 3 after the first immunization according to the immunization groups. Blood was collected from the eye sockets 2 weeks after the second immunization to measure the antibody titer in the serum.

The antibody titers in serum were detected by enzyme-linked immunosorbent assay (ELISA) to evaluate the vaccine-induced IgG and IgM levels in mouse serum.

III. Experimental Results

Figure 8:
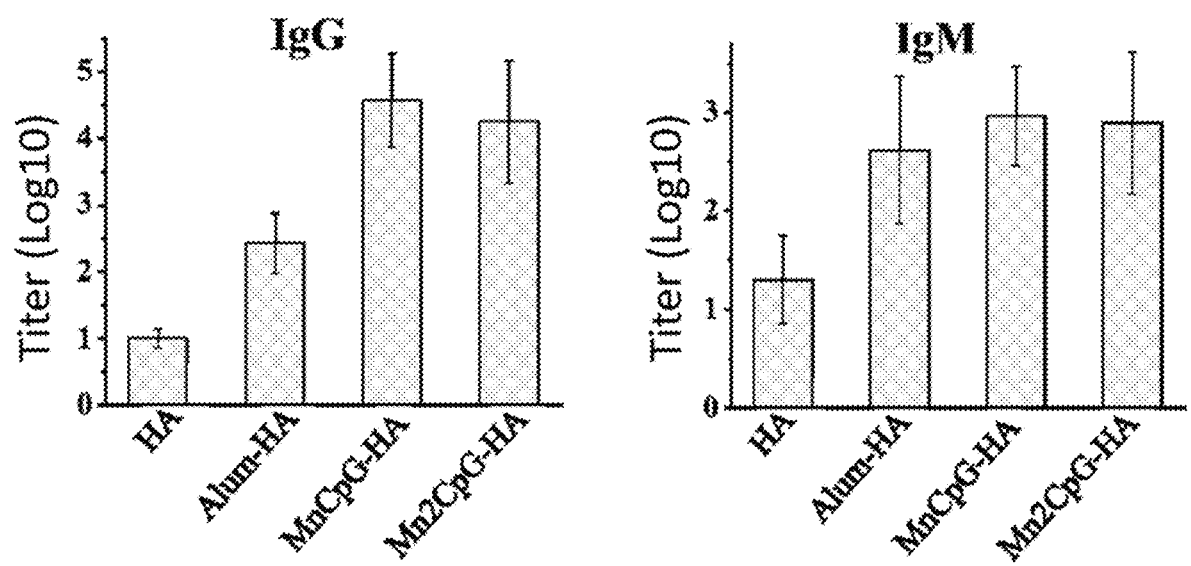
FIG. 8 shows the results of specific antibody titers of mice 2 weeks after secondary immunization with MnCpG, Mn2CpG prepared in step A and step B of Example 4 of the present invention or commercial aluminum adjuvant Alum carrying the influenza H1N1 HA antigen.

FIG. 8 shows the analysis results of titers of the specific antibodies produced after the mice were immunized with the adjuvant composition MnCpG and adjuvant composition Mn2CpG prepared in step A and step B of Example 11 of the present application, or the commercial aluminum adjuvant Alum carrying influenza H1N1 HA antigen.

The experimental results are shown in FIG. 8A. The vaccines prepared with the adjuvant composition MnCpG and the adjuvant composition Mn2CpG obtained in step A and step B of Example 11 of the present invention better enhance the immune response than the vaccine prepared with the commercial aluminum adjuvant, and the antibody titers produced are 137 times and 96 times that of the commercial aluminum adjuvant, respectively.

The experimental results are shown in FIG. 8B. The vaccines prepared with the adjuvant composition MnCpG and the adjuvant composition Mn2CpG obtained in step A and step B of Example 11 of the present invention have higher IgM levels than the vaccine prepared with the commercial aluminum adjuvant, and the antibody titers produced are 4.3 times and 3.1 times that of the aluminum adjuvant, respectively.

The results in FIG. 8 show that the vaccines prepared with the adjuvant composition MnCpG and the adjuvant composition Mn2CpG prepared in step A and step B of Example 11 have more effective immune enhancement capabilities than the vaccines prepared with the commercial aluminum adjuvant.

Example 16 Preparation of Adjuvant Composition of Trimanganese Tetraoxide Nanoparticulate Adjuvant Combined with Other Oligonucleotides A) 5 ml of 5 mg/ml solution of the trimanganese tetraoxide particles prepared in Example 3 in MES buffer at about pH 6, was mixed with 1 ml of 0.02 mmol/ml solution of EDC in MES buffer at about pH 6, and activated at 35° C. for 30 min. Then, 1 ml of 0.02 mmol/ml solution of NHS in MES buffer at about pH 6 was added, and the activation was continued for 2 h. Then, unreacted EDC and NHS and reaction by-products were removed by dialysis, and then 2 ml of 0.04 mmol/ml ATP solution was added and the system was mixed. Maintained at pH 8.0, the mixture was allowed to react at room temperature with stirring at 300 rpm for 2 h, and purified by ultrafiltration to complete the preparation of the adjuvant composition of trimanganese tetraoxide nanoparticulate adjuvant and ATP, thereby giving the adjuvant composition of trimanganese tetraoxide nanoparticulate adjuvant and ATP (adjuvant composition Mn3ATP).

B) 10 ml of 10 mg/ml solution of the trimanganese tetraoxide particles prepared in Example 4 in MES buffer at about pH 5.7, was mixed with 2 ml of 0.05 mmol/ml solution of EDC in MES buffer at about pH 5.7, and activated at 35° C. for 30 min. Then, 2 ml of 0.05 mmol/ml solution of NHS in MES buffer at about pH 5.7 was added, and the activation was continued for 2 h. Then, unreacted EDC and NHS and reaction by-products were removed by dialysis, and then 5 ml of 0.1 mmol/ml ADP solution was added and the system was mixed. Maintained at pH 7.8, the mixture was allowed to react at room temperature with stirring at 600 rpm for 15 h, and purified by ultrafiltration to complete the preparation of the adjuvant composition of trimanganese tetraoxide nanoparticulate adjuvant and ATP, thereby giving the adjuvant composition of trimanganese tetraoxide nanoparticulate adjuvant and ATP (adjuvant composition Mn4ADP).

C) 5 ml of 10 mg/ml solution of the trimanganese tetraoxide particles prepared in Example 5 in MES buffer at about pH 5.7, was mixed with 2 ml of 0.05 mmol/ml solution of EDC in MES buffer at about pH 5.7, and activated at 35° C. for 30 min. Then, 2 ml of 0.05 mmol/ml solution of maleimide in MES buffer at about pH 8.7 was added, and the activation was continued for 2 h. Then, unreacted EDC and NHS and reaction by-products were removed by dialysis, and then 5 ml of 0.1 mmol/ml AMP solution was added and the system was mixed. Maintained at pH 8.7, the mixture was allowed to react at room temperature with stirring at 900 rpm for 24 h, and purified by ultrafiltration to complete the preparation of the adjuvant composition of trimanganese tetraoxide nanoparticulate adjuvant and ATP, thereby giving the adjuvant composition of trimanganese tetraoxide nanoparticulate adjuvant and ATP (adjuvant composition Mn5AMP).

D) 5 ml of 0.2 mmol/ml aqueous solution of the trimanganese tetraoxide particles prepared in Example 6 was mixed with an equal volume of 0.0005 mmol/ml thiol-modified CpG (purchased from Sangon Biotech, tcgtcgttttcggcgegegceg-SH (SEQ ID NO: 1)). With the pH being maintained at 8.4, the mixture was allowed to react with stirring at room temperature and 500 rpm for 2 h, and purified by ultrafiltration to complete the preparation of the adjuvant composition of trimanganese tetraoxide nanoparticulate adjuvant and CpG to obtain an adjuvant composition of trimanganese tetraoxide nanoparticulate adjuvant and CpG (adjuvant composition Mn6CpG).

Example 17 Preparation of Composite Vaccine and Evaluation of Enhanced Protection Effect Against Parasite According to toxoplasmosis-related protection research, the novel dense granulin GRA is one of the main components of the excretory-secretory antigens (ESAs) secreted by the parasite when it actively invades host cells, and is related to the intracellular maintenance of the parasite. Related research shows that it can be used as a vaccine drug.

The experimental mice were randomly divided into groups, with 10 mice in each group:
① Ctr group (control group): The injection volume was 100 µL, and the injection solution was normal saline;
② Ag group: The injection volume was 100 µL, and 10 µg of GRA antigen was injected;
③ ATP-Ag group: The injection volume was 100 µL, and 10 µg of GRA antigen combined with ATP adjuvant was injected;
④ ADP-Ag group: The injection volume was 100 µL, and 10 µg of GRA antigen combined with ADP adjuvant was injected;
⑤ Mn3-Ag group: The injection volume was 100 µL, and a nano-vaccine constructed by 25 µg of manganese-comprising particulate adjuvant prepared in Example 3 of the present invention carrying 10 µg of GRA antigen was injected;
⑥ Mn4-Ag group: The injection volume was 100 µL, and 50 µg of commercial aluminum adjuvant Alum (Invivogen, Alhydrogel® adjuvant 2%, CAS: 21645-51-2) carrying 10 µg of RBD antigen was injected;
⑦ Mn3ATP-Ag group: The injection volume was 100 µl, and the adjuvant composition vaccine constructed in step A of Example 16, i.e., Mn3ATP carrying 10 µg of RBD antigen (Ag), was injected.
⑧ Mn4ADP-Ag group: The injection volume was 100 µl, and the vaccine constructed in step B of Example 16, i.e., Mn4ADP carrying 10 µg of RBD antigen (Ag), was injected.

The adjuvant compositions prepared in Example 16 were each mixed with 10 µg of GRA vaccine drug, the group without the adjuvant composition was used for comparison, and the experimental mice were immunized by injection. Five weeks after the injection, mice in each of the experimental groups were infected with *Toxoplasma gondii* RH strain. The survival rate of mice in each of the experimental groups was observed and recorded every day. The experimental results are shown in the following table:

TABLE 2

Statistics of the survival rate of mice in each of the experimental groups over the number of days (survival rate * 100%)

| Days | 1 | 2 | 3 | 4 | 5 | 6 | 7 | 8 | 9 |
|---|---|---|---|---|---|---|---|---|---|
| Ctr | 100 | 100 | 60 | 20 | 0 | 0 | 0 | 0 | 0 |
| Ag | 100 | 100 | 100 | 100 | 70 | 40 | 20 | 10 | 0 |
| ATP-Ag | 100 | 100 | 100 | 90 | 80 | 50 | 30 | 10 | 0 |
| ADP-Ag | 100 | 100 | 100 | 90 | 70 | 40 | 30 | 10 | 0 |
| Mn3-Ag | 100 | 100 | 100 | 100 | 90 | 70 | 60 | 50 | 40 |
| Mn4-Ag | 100 | 100 | 100 | 100 | 80 | 60 | 60 | 50 | 40 |
| Mn3ATP-Ag | 100 | 100 | 100 | 100 | 100 | 100 | 80 | 70 | 60 |
| Mn4ADP-Ag | 100 | 100 | 100 | 100 | 100 | 90 | 70 | 60 | 60 |

From this table, it can be seen that the trimanganese tetraoxide nanoadjuvants constructed in Examples 3 and 4 and the combined nanoadjuvants Mn3ATP and Mn4ADP constructed in Example 16 can significantly enhance the immune effect of the original GRA vaccine.

Finally, it should be noted that the above examples are only used to illustrate the technical solutions of the present invention rather than to limit the protection scope of the present invention. For those of ordinary skill in the art, other different forms of changes or modifications can be made based on the above descriptions and ideas. It is unnecessary and impossible to list all the embodiments here. Any modifications, equivalent substitutions and improvements made within the spirit and principles of the present invention should be included in the protection scope of the claims of the present invention.

The invention claimed is:

1. An adjuvant composition comprising an adjuvant particle comprising:
  (a) a trimanganese tetraoxide particle,
  (b) a single nucleotide or a single-stranded nucleotide, and
  (c) an excipient, wherein the excipient comprises a protein, a polypeptide, a polymer, a nucleic acid, or a polysaccharide, wherein the excipient and the single nucleotide or the single-stranded nucleotide form a covalent bond, and wherein the size of the adjuvant particle is about 5 nm to about 3000 nm, wherein the covalent bond is based on a chemically selective covalent modification group pair carried by the excipient and the single nucleotide or the single-stranded nucleotide.

2. The adjuvant composition of claim 1, wherein the single nucleotide or the single-stranded nucleotide comprises an oligonucleotide.

3. The adjuvant composition of claim 2, wherein the oligonucleotide comprises CpG oligodeoxynucleotides (CpG ODN).

4. The adjuvant composition of claim 1, wherein the single nucleotide or single-stranded nucleotide comprises a DNA fragment, an ATP, an ADP, or an AMP.

5. The adjuvant composition of claim 1, wherein the single nucleotide or single-stranded nucleotide comprises a modified DNA fragment, wherein the modified DNA fragment is a DNA fragment that has been subjected to functionalization of an amino functional group, a carboxyl functional group, a thiol functional group, or a chemically selective covalent modification group.

6. The adjuvant composition of claim 1, wherein the chemically selective covalent modification comprises maleimide, 1-(3-dimethylaminopropyl)-3-ethylcarbodiimide, or succinimide.

7. The adjuvant composition of claim 1, wherein the molar ratio of manganese element in the trimanganese tetraoxide particles to the excipient is between 20:1 and 4000:1.

8. An adjuvant composition comprising an adjuvant particle comprising:
  (a) a trimanganese tetraoxide particle,
  (b) a single nucleotide or a single-stranded nucleotide, wherein the single nucleotide or single-stranded nucleotide comprises a DNA fragment, an ATP, an ADP, or an AMP, and (c) an excipient, wherein the excipient comprises a protein, a polypeptide, a polymer, a nucleic acid, or a polysaccharide, wherein the excipient and the single nucleotide or the single-stranded nucleotide form a covalent bond, and wherein the size of the adjuvant particle is about 5 nm to about 3000 nm.

9. The adjuvant composition of claim 8, wherein the DNA fragment-single nucleotide or single-stranded nucleotide comprises a modified DNA fragment.

10. The adjuvant composition of claim 9, wherein the modified DNA fragment is a DNA fragment that has been subjected to functionalization of an amino functional group, a carboxyl functional group, a thiol functional group, or a chemically selective covalent modification group.

11. The adjuvant composition of claim 9, where the modified DNA fragment comprises a maleimidation, a succinimidation, or a 1-(3-dimethylaminopropyl)-3-ethylcarbodiimide hydrochloride.

12. A vaccine comprising the adjuvant composition of claim 1, wherein the adjuvant composition further comprises a vaccine antigen.

13. The vaccine of claim 12, wherein the vaccine antigen comprises one or more of a subunit antigen derived from an inactivated pathogen, a subunit antigen derived from an extracted pathogen subunit antigen, a recombinant subunit antigen, an antigenic epitope peptide, and a nucleic acid antigen.

14. The vaccine of claim 13, wherein the vaccine antigen comprises a subunit antigen derived from an inactivated pathogen or an extracted pathogen, wherein the pathogen is comprises includes a virus, a bacterium or a parasite.

15. The vaccine of claim 14, wherein the pathogen is comprises a virus.

16. The vaccine of claim 15, wherein the virus is a DNA virus or an RNA virus.

17. The vaccine of claim 15, wherein the virus is selected from the group consisting of: Coronavirus, Herpesviridae, Rhabdoviridae, Filoviridae, Orthomyxoviridae, Paramyxoviridae, Picornaviridae, Hepadnaviridae, Flaviviridae, Papillomaviridae, Poxviridae, and Retroviridae.

18. The vaccine of claim 15, wherein the virus is selected from the group consisting of coronavirus, influenza virus, herpes simplex virus, vesicular stomatitis virus, vaccinia virus, HIV and HBV.

19. The vaccine of claim 15, wherein the virus is a coronavirus or an influenza virus.

20. The vaccine of claim 14, wherein the pathogen is a parasite.

21. The vaccine of claim 20, wherein the parasite is selected from the group consisting of *Plasmodium, Toxoplasma, Trypanosoma, Schistosoma, Filaria* and *Leishmania*.

* * * * *